Figure 1:
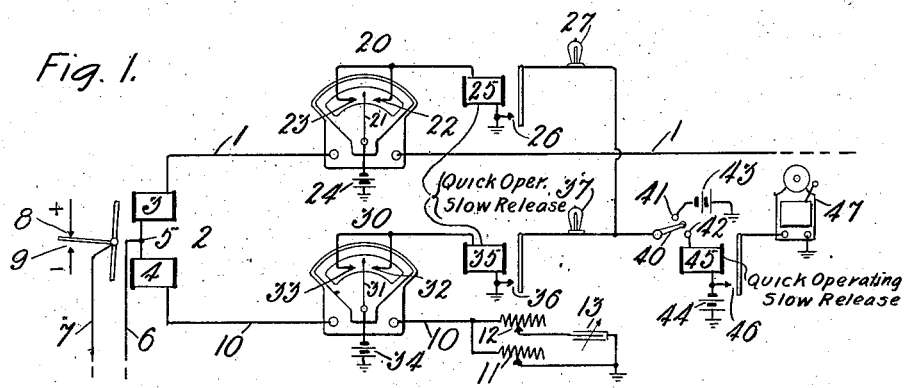

J. H. BELL.
TELEGRAPH SYSTEM.
APPLICATION FILED AUG. 1, 1917.

1,296,613.

Patented Mar. 11, 1919.

Inventor:
John H. Bell
by J. E. Roberts Att'y.

UNITED STATES PATENT OFFICE.

JOHN HUME BELL, OF EAST ORANGE, NEW JERSEY, ASSIGNOR TO WESTERN ELECTRIC COMPANY, INCORPORATED, OF NEW YORK, N. Y., A CORPORATION OF NEW YORK.

TELEGRAPH SYSTEM.

1,296,613.

Specification of Letters Patent.  Patented Mar. 11, 1919.

Application filed August 1, 1917. Serial No. 183,868.

*To all whom it may concern:*

Be it known that I, JOHN H. BELL, a citizen of the United States, residing at East Orange, in the county of Essex and State of New Jersey, have invented certain new and useful Improvements in Telegraph Systems, of which the following is a full, clear, concise, and exact description.

This invention relates to telegraph systems and more particularly to duplex or similarly balanced electrical circuits.

Th principal object of this invention is to provide apparatus and system for indicating variation of electrical characteristics in the circuits of duplex telegraph systems or equipments, wherein it is required to maintain predetermined conditions of electrical balance between a plurality of circuits.

In carrying out the present invention, there is provided a plurality of current indicating devices and adjustable circuit controlling means therefor to be included with electrically balanced circuits in a manner to indicate variations of balance greater than predetermined range limits between the circuits.

This invention is illustrated in the accompanying drawing, in which portions of the equipment are shown diagrammatically, while other portions thereof are shown in perspective. The embodiment chosen for illustrating the features of the present invention has been planned in connection with telegraph duplex systems, and in order to simplify the drawing only so much of a telegraphic equipment is shown as will be necessary to a clear understanding of the invention.

Figure 2:
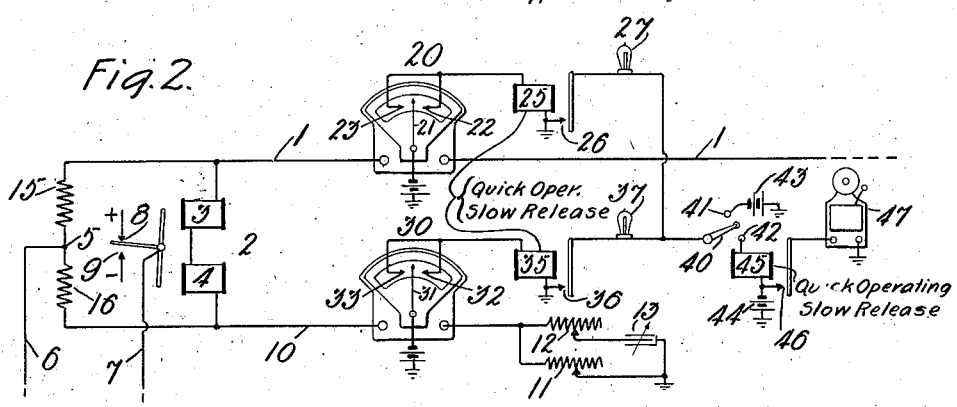
Figure 3:
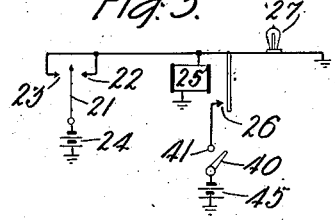
Figure 4:
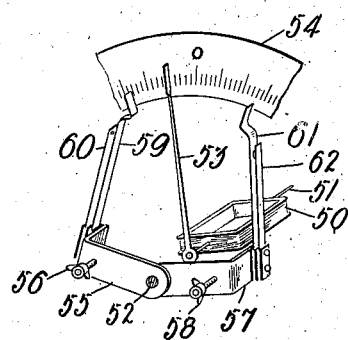

In the drawing, Figure 1 illustrates the application of this invention to a differential duplex polar type telegraphic equipment; Fig. 2 shows the invention applied to a bridge duplex telegraphic equipment; Fig. 3 illustrates an alternate circuit arrangement for a signal control relay; and Fig. 4 shows a proposed arrangement for adjustable contacts to be operated by current indicating meters employed in this system.

Briefly described, this system provides that a current indicating meter equipped with contacts under control of its hand or needle will be included one in the circuit of the main line, and one in the artificial line of a duplex telegraph equipment. Relays under control of the meter contacts in turn control the operation of visual and audible signals. The meter contacts are arranged to be adjustably moved with respect to the needle in order that the contacts will be ineffective except when the strength of currents through the meter vary with respect to a predetermined range.

In more specifically describing the present system, attention will first be directed to Fig. 1 of the drawing. A main line conductor 1 is connected through a milliammeter 20 and a polarized relay 2 to an artificial line 10. The artificial line extends through a milliammeter 30 whence it branches, one path comprising an adjustable resistance 11 to earth, while a second path is formed through an adjustable resistance 12 and an adjustable or variable condenser 13 to earth.

Telegraphic duplex equipments being well known in the art, it will, therefore, be obvious that a conductor 6 may be included with suitable telegraph transmitting equipment, while the conductor 7 may be included with a suitable telegraph receiving equipment for respectively transmitting outgoing impulses and for receiving incoming impulses by way of the line conductor 1. It will also be obvious that through adjustment of the variable resistances 11 and 12 and the variable condenser 13 the electrical characteristics of the artificial line 10 may be calibrated to correspond or balance with the electrical characteristics of the main line 1. The connective point for such balance of electrical condition between the artificial line 10 and the main line 1 being present at the apex or neutral point 5, intermediate the coils 3 and 4 of the line relay 2. In the present telegraph system it will be understood the line conductor 1 extends to a distant station (not shown) at which it may preferably be provided with equipment similar to the duplex apparatus shown, thereby permitting messages to be transmitted simultaneously in each direction between the two stations, on the well known two-current basis.

Referring to Fig. 4 of the drawing an ammeter coil 50, carried by a reciprocally movable shaft 51 is connected to move an indicating hand or needle 53 over a meter scale 54. Angle brackets 55 and 57 carried by a shaft member 52 may be moved radially and held at any desired position by clamping action of respective wing nuts 56 and 58 engaging suitably fixed members (not shown). Contact spring members 59 and 60, 61 and 62 carried by the brackets 55 and 57 respectively, are insulated one from another and also from their supporting brackets. The zero or no current position of the needle 53 is at a central point on the scale 54 as conventionally indicated by the zero character. Therefore, current action in a given direction through the coil 50 will cause the needle 1 to be deflected to one side, while current action in the opposite direction through the coil causes the needle to be deflected to the opposite side. In case a strength of current in the coil 50 is sufficient the needle 53 will be deflected to reach and exert pressure to flex the spring 59 to establish contact with its associated contact member 60 or to flex the spring 61 into contact with its associated contact member 62, according to the direction of the current through the coil 50. It will be obvious that by shifting the position of the contact members 59 to 61, with relation to the zero point on the scale 54, the contacts will remain inactive for currents of a predetermined strength through the moving coil 50, but will become active under currents in excess of such predetermined value. It will be understood that in substitution of two contact members t each side of the needle 53 an alternate arrangement would correspond with the schematic or circuit illustration shown in connection with the meters in Figs. 1 and 2. In adapting the apparatus shown in Fig. 4 to this alternate arrangement the contact members 60 and 62 may be dispensed with and the needle 53 connected to form a contact member to engage either one or the other of the remaining contact members 59 and 61 according to the direction in which the needle may be deflected.

Referring to Fig. 1, let it be assumed for purposes of description that the artificial line conductor 10 has been electrically calibrated or balanced with the line conductor 1; and that the characteristics of these circuits are such that on the proper inclusion of current sources having predetermined potentials with the conductor 6, as through a telegraph transmitter, a current of fifty milliamperes will be maintained in the artificial line 10, while current of a corresponding strength will also be maintained in the line conductor 1. Currents of such strengths may be taken as working values for the transmission of message impulses. Therefore, let it be further assumed that in setting predetermined range limits for such current strengths the contacts 22 and 23, 32 and 33 of the milliammeters 20 and 30 respectively are adjusted adjacent points on the meter scales corresponding with fifty-five milliamperes. With such settings of the meter contacts it will be obvious that so long as the calibrated circuit condition of the telegraph system remains unchanged the meter needles, in regularly responding to telegraphic impulses, will not be deflected beyond the predetermined points corresponding with fifty milliamperes, and, therefore, the associated contacts will not be closed.

Assuming now that for some reason, say, a change from dry to rainy weather, the insulation of the line 1 becomes lowered to the extent that leakage therefrom would reduce its resistance condition with respect to the earth to an extent that the sources of grounded current assumed to be included telegraphically with the conductor 6 may develop a current equal to or in excess of fifty-five milliamperes through the meter 20. Such increase of current strength would cause the needle 21 to engage its contact 22—23 in phase with changes in polarity of the telegraphic impulses, thereby including a source of current 24, through the winding of a relay 25 to earth. Assuming that a switch 40 is on its point 42, operation of the relay 25 establishes a circuit from a source of current 44, through the winding of a relay 45, a lamp signal 27, thence over the contacts 26 of the relay 25, to earth. The lamp 27 is thereby lighted and the relay 46 operated to include through its contacts 46, the current source 44 with a signal bell 47. Operation of the audible signal 47 notifies an attendant, and manifestation of the visual signal 27 denotes that the unbalance is due to a reduced resistance condition of the line 1, whereupon the adjustable devices 11, 12 and 13 of the artificial line may be immediately moved to lower the resistance thereof to such point that readings of the telegraphic impulses on the meters 20 and 30 will indicate when a new balance has been established to meet the change in electrical characteristics of the main line 1. On account of this new balance of the duplex circuits, increase of current strength will be present through the milliammeters 20 and 30; therefore, to provide operating margins to meet this condition the contacts 22 and 23, 32 and 33 of the meters will require readjusting to such points on the respective scales as will clear by a predetermined margin the respective needles as they move in greater amplitude corresponding with the increased strength of the telegraphic impulses.

In describing further service conditions met by the present invention, the last described balance of the duplex circuit will be taken as a first condition of the telegraph system for a second example. Following the rainy weather conditions, let it now be assumed that a change to clear weather and a corresponding drying of the line 1 takes place, thereby increasing the resistance of the line with respect to the earth. In accordance with usual telegraph practice, let it be assumed that resistance units or equivalents therefor usually employed as battery protective devices are present intermediate the sources of current and the telegraph transmitter assumed as included with the conductor 6. Such condition in the current supply circuit is accordingly accumulative with other characteristics manifested in the telegraph system, due to the increase in insulation resistance of the line 1, whereby a higher current potential will be present at the neutral point 5 of the duplex equipment, all as may be readily apparent by application of Ohm's law. It follows, therefore, that, due to the increase in potential of outgoing telegraphic impulses at the neutral point 5, currents of greater strength will flow through the milliammeter 30 of the artificial line 10. The greater amplitude of movement imparted by these currents to the needle 31 will cause it to reach its contacts 32—33 in phase with the polarity of the current impulses, whereupon the current source 34 will be included to operate the relay 35 to in turn energize a signal 37 and the relay 44 and through the latter relay effect operation of the bell 47, as already described. Such energized condition of the signal 37 indicates that the unbalance of the duplex circuit is due to a higher resistance condition in the line circuit 1. Therefore, the adjustable devices 11, 12 and 13 of the artificial line 10 may be readjusted to increase the resistance thereof until the ammeters 20 and 30 under telegraphic impulses will indicate that a new balance has been established with respect to the artificial line and the line 1. The contacts 22 and 23, 32 and 33 may accordingly be readjusted to predetermined points on the ammeter scales beyond which fluctuations of balance range must not be permitted to extend without attention being called thereto by the signals as described.

Referring to Fig. 2 of the drawing, it will be noted that the equipment shown therein is the same as the equipment shown and described in connection with Fig. 1, except that in Fig. 2 the duplex arrangement of the telegraph circuit is on the basis of the well known bridge plan. For convenience, the same reference characters, as employed in Fig. 1, have been used in so far as they apply to designate like parts in this figure of the drawing.

In the bridge duplex equipment resistance units 15 and 16 serve as arms intermediate which the neutral point 5 may be connected by a conductor 6 to suitable telegraphic transmitting apparatus (not shown). Adjustment of the variable devices 11, 12 and 13 of the artificial line conductor 10 to establish this line in electrical balance with the main line conductor 1 results in a zero potential effect at the terminals of the line relay 2 for outgoing telegraphic impulses transmitted over the conductor 6. Incoming impulses from the line conductor 1 complete circuit through the windings of the line relay 2, thence over the artificial line 10 to earth. Since the incoming impulses act accumulatively on the coils 3 and 4 of the polarized line relay 2, its armature will be biased in phase with the polarity sign of such incoming impulses to work its contacts 8 and 9, whereby corresponding retransmission of positive and negative impulses will take place over the conductor 7, which may extend to suitable receiving equipment.

Referring to Fig. 3 of the drawing, this alternate circuit arrangement for the signal control relays 25—35 provides that following initial operation of either relay it will become self-locked and thereby continue energized irrespective of the operating circuit first established through its associated ammeter needle. Such operation may be traced by assuming a meter deflection to include the needle 21 with its contact 23, whereby the current source 24 will be established through the winding of relay 25 to earth. Operation of the relay 25 and the closing of its contacts 26 establish the current source 45 over the switch contacts 40, 41 (now closed), through the winding of the relay 25 to earth, and since the signal 27 is connected in parallel with the winding of the relay 25, this signal will accordingly be displayed until such time as the switch member 40 is moved to disconnect the relay 25. It will be obvious that the locking circuit of the relay 25 may be extended to control the relay 44, whereby the audible signal 47 may also be operated as described in connection with Fig. 1. Such locking of the relay 25 would be of particular advantage in giving warning of intermittent or momentary changes or fluctuations of current balance in the duplex system.

As indicated, quick operation and slow releasing of the relays 25, 35 and 44 may be desirable under usual service conditions to give an obvious advantage in connection with the operation of the signals 27, 37 and 47. The switch 40 is provided for cutting out all signals if desired or when thrown to its contact 41 this switch substitutes the current source 43 for the current source 44, which is routed through the relay 45, thereby cutting out the signal 47 only.

It may be pointed out that the present system is of especial value in connection with multiplex telegraph working wherein heavy traffic in multiple channel operation, as quadruplex, octoplex, etc., would not ordinarily require to be interrupted in case it may be necessary to readjust the artificial line to overcome an unbalance of the duplex circuits. Such service advantages may readily obtain through adjusting the contacts of the ammeters to present a gap space with respect to maximum deflection of the needle under the normal strength of telegraphic impulses during proper balance of the circuits, and at the same time providing that such gap space be within the margins of current range through which actual mutilation of the telegraphic signals would not take place. Under such adjustments it will be clear that the signal system would serve as an advance warning to permit adjustments to be made in the variable circuits of the artificial line in advance of an unbalanced condition reaching a point at which telegraphic signals would be mutilated or perhaps interrupted.

It will be further understood that it would be possible to employ a differential current meter provided with contacts and connected at the apex or neutral point of a duplex circuit, or an ammeter with contacts may be connected in series with a polar relay across a bridge duplex, the contacts of the meters being connected to signal controlling circuits similar to those already described.

From the foregoing description of this invention it will be further obvious that alternating current ammeters may be substituted for the direct current ammeters shown, and that such ammeters may preferably be of the so-called dead beat type. Contacts suitably arranged to be controlled by the needle of the alternating current ammeters would readily apply to the control of signaling circuits, which may be substantially the same as those illustrated herein.

What is claimed is:

1. In a telegraph duplex equipment, a main line conductor, an ammeter included with said line conductor, an artificial line, an ammeter included with said artificial line, a line relay included with said main line and said artificial line, contacts controlled by said ammeters, relays controlled by said ammeter contacts, and signals under control of said relays.

2. In a duplex telegraph system, a main line, an artificial line, a relay included with said main line and said artificial line responsive to incoming signals, but unresponsive to outgoing impulses by way of said main line, an ammeter in said main line and an ammeter in said artificial line responsive to both incoming and outgoing impulses by way of said main line, signal control relays, and contacts controlled by said ammeters for controlling the operation of said signal control relays.

In witness whereof, I hereunto subscribe my name this 31st day of July, A. D., 1917.

JOHN HUME BELL.